Patented July 15, 1952

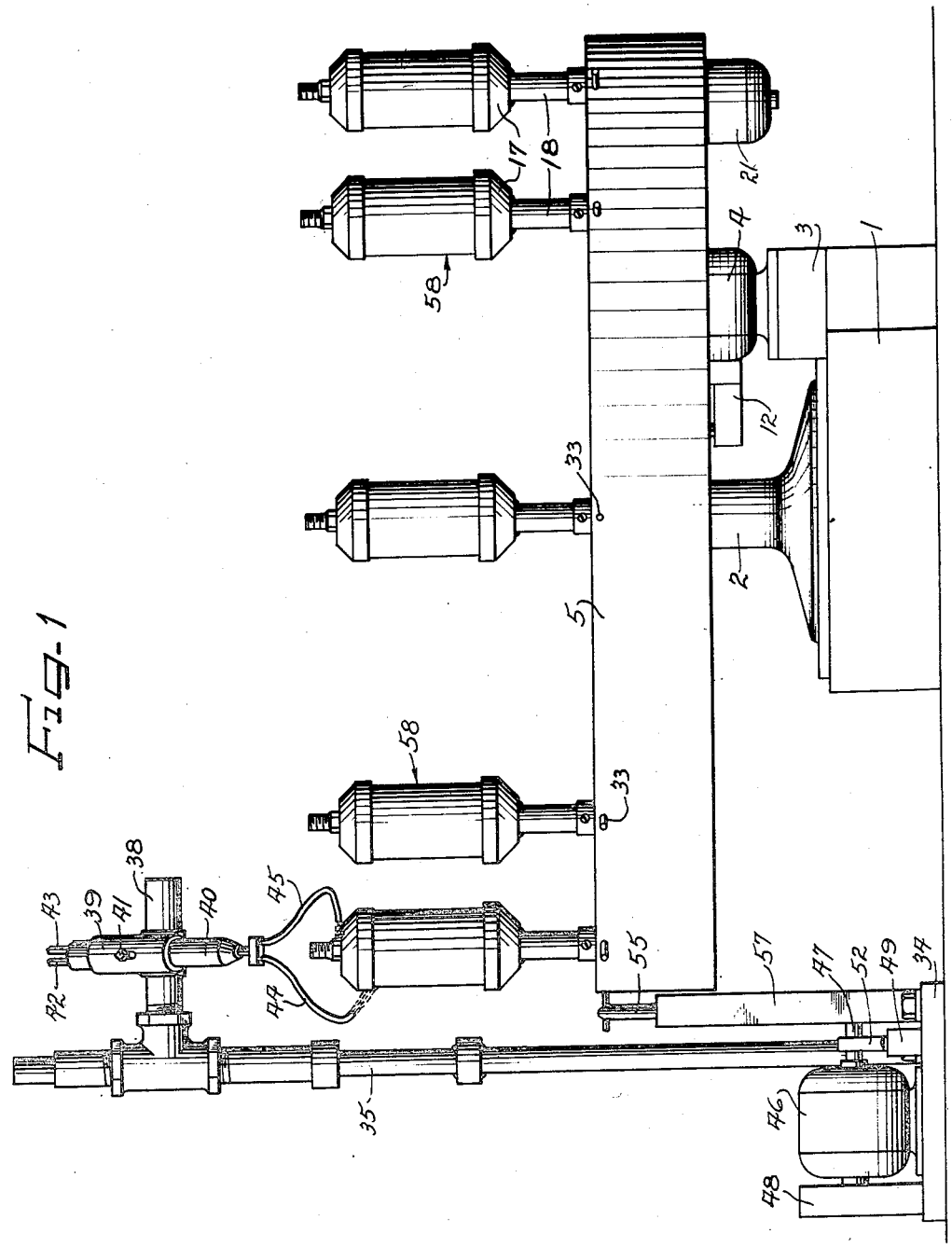

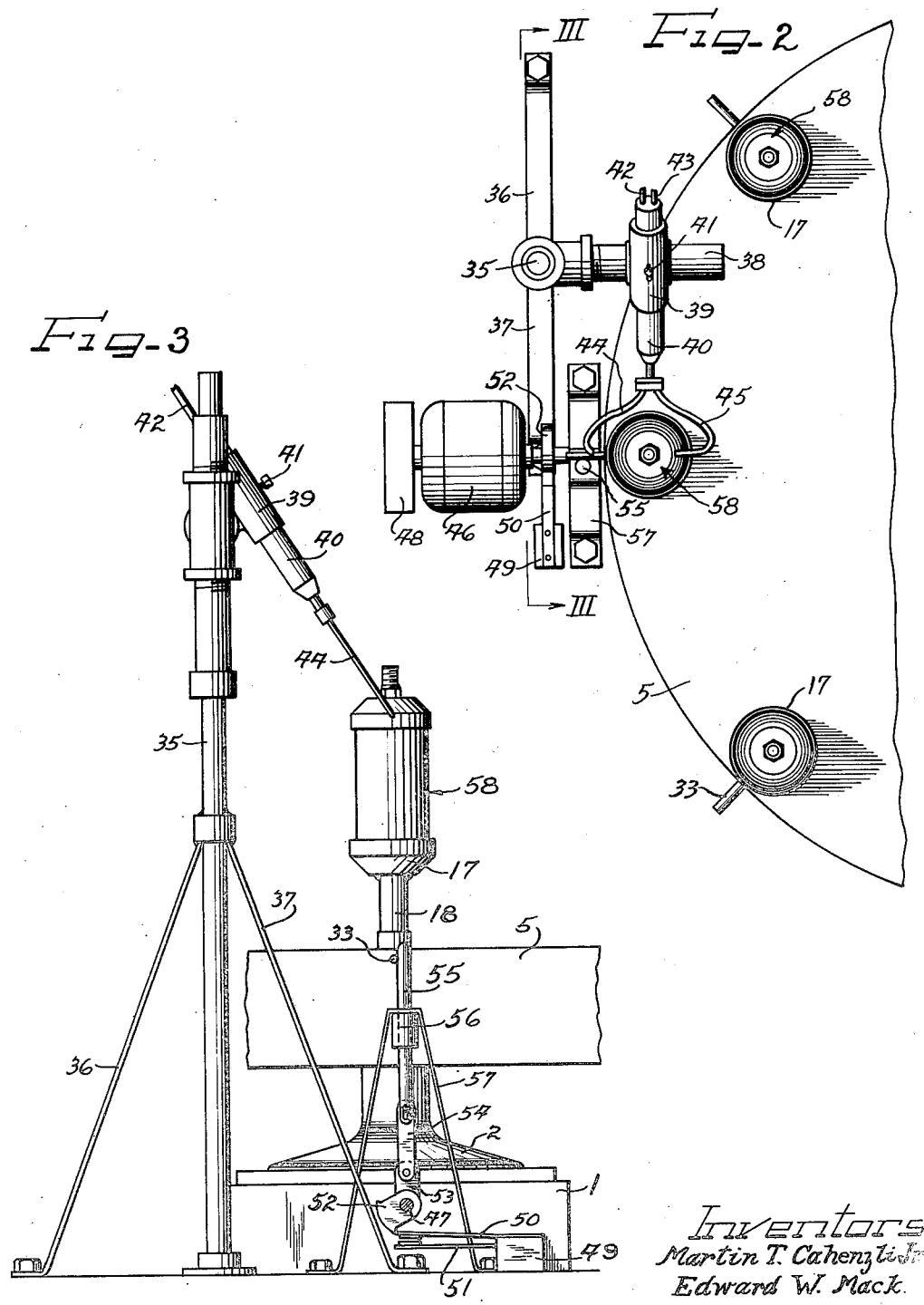

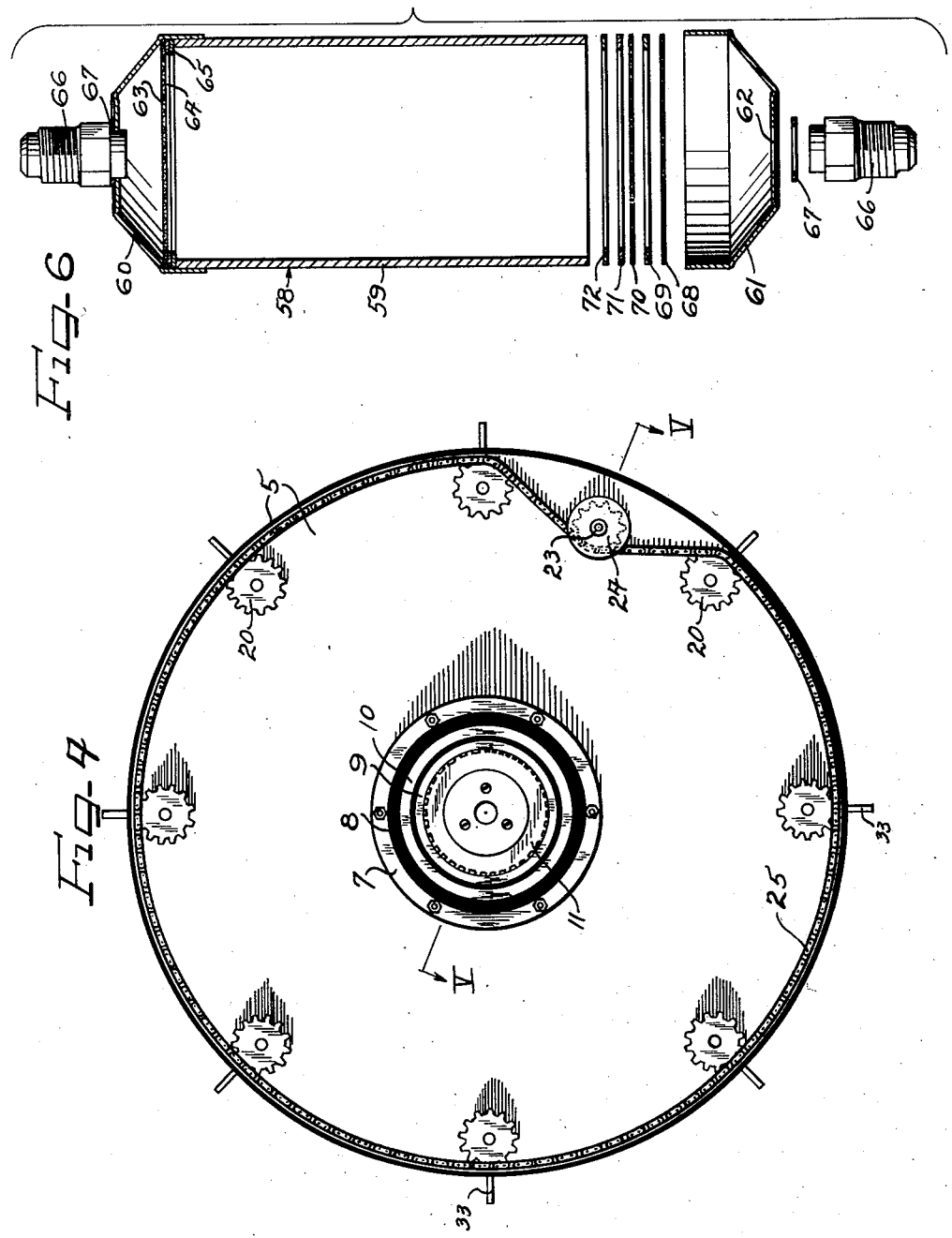

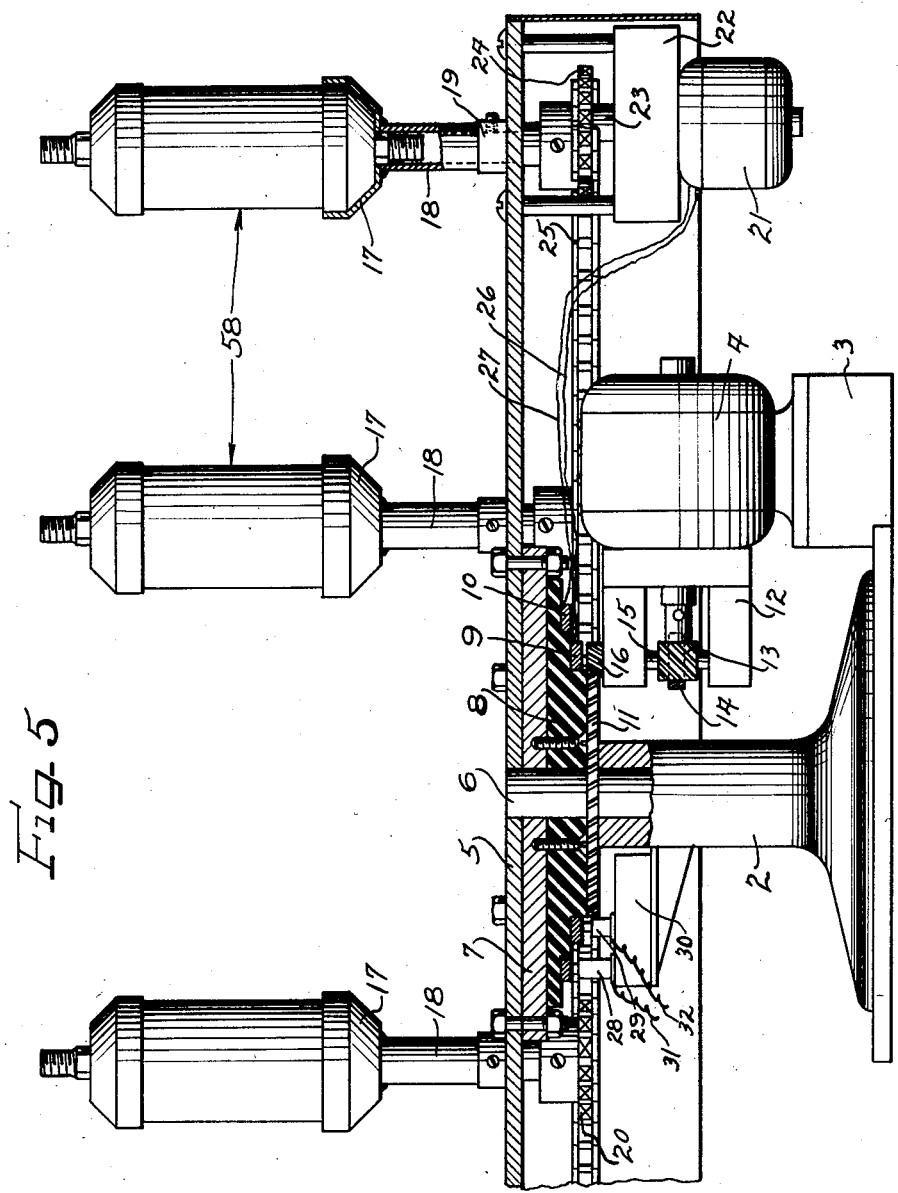

2,603,178

UNITED STATES PATENT OFFICE 2,603,178

BRAZING MACHINE

Martin T. Cahenzli, Jr., and Edward W. Mack, Chicago, Ill., assignors to The Harry Alter Company, Chicago, Ill., a corporation of Illinois Application May 4, 1945, Serial No. 591,902

2 Claims. (Cl. 113—59)

This invention relates to improvements in a method of brazing and in a brazing machine, highly desirable for brazing various industrial products to provide a sealed joint between adjacent parts, although the invention will have other uses and purposes as will be apparent to one skilled in the art.

In the past, many and various types of brazing machines have been developed, but insofar as we are aware these formerly known machines have proven objectionable, especially in that it was extremely difficult to rapidly braze closures on shells or containers, or perform similar brazing operations, without damaging certain of the contents of the parts being brazed. That is, brazing machines of the character heretofore known were not capable of localizing the heat necessary for the brazing operation to a sufficient extent to avoid damage to interior parts, other than those parts being connected by the brazing operation. Further, brazing machines heretofore known were not as sufficiently economical as may be desired, were not capable of performing a plurality of brazing jobs upon a single industrial article simultaneously, and would not perform separated brazing jobs simultaneously and very closely together with adequate localization of the brazing heats.

In view of the foregoing, it is an important object of the instant invention to provide a brazing machine capable of simultaneously performing separate brazing operations upon the same work piece.

Another object of this invention resides in the provision of a machine capable of performing a plurality of separate brazing operations simultaneously upon the same work piece and in locations relatively close together while maintaining a relatively cold spot between the brazing locations.

A further object of the instant invention resides in the provision of a machine capable of performing a number of simultaneous brazing operations upon the same work piece, and localizing or concentrating the heat at closely adjacent points in such a manner to avoid injury to any exterior or internal part of the work piece between such points.

It is also an object of the instant invention to provide a brazing machine capable of providing uniform heating of the work piece at separated closely adjacent points.

Still a further object of the instant invention resides in the provision of a brazing machine capable of automatically and rapidly brazing work pieces in continuous succession.

A further feature of the instant invention resides in the provision of a brazing machine incorporating an indexing work-carrying table equipped with a plurality of work holders at spaced intervals therearound or therealong, such holders being designed to accommodate the work pieces in upright or inverted position.

It is also an object of this invention to provide a brazing machine equipped with means for carrying a plurality of spaced work holders, with means to insure the substantially constant rotation of each holder and the piece carried therein.

More specifically, it is an important object of the instant invention to provide a brazing machine capable of performing one or more brazing operations at the same time upon a work piece in the form of a hollow container, without injury to the contents of the work piece, such contents being present while the brazing operation is in progress.

It is also a feature of the instant invention to provide a brazing machine, economical to both construct and operate, which is automatic in operation, which may be adjusted to accommodate work pieces of various sizes and types, and which is relatively compact in construction and occupies a correspondingly small space.

It is also a feature of the instant invention to provide a new and novel method of brazing.

While some of the more salient features, characteristics and advantages of the instant invention have been above pointed out, others will become apparent from the following disclosures, taken in conjunction with the accompanying drawings, in which:

Figure 1 is a side elevational view of a brazing machine embodying principles of the instant invention;

Figure 2 is a fragmentary top plan view of the structure seen in the left-hand portion of Figure 1;

Figure 3 is a fragmentary vertical sectional view taken substantially as indicated by the line III—III of Figure 2, looking in the direction of the arrows;

Figure 4 is a bottom plan view of the turret or work-carrying wheel, with parts omitted;

Figure 5 is an enlarged fragmentary part sectional, part elevational view, taken substantially as indicated by the line V—V of Figure 4; and Figure 6 is a view partly in elevation and partly exploded illustrating by way of example and not by way of limitation, the construction of a work piece upon which the brazing machine may perform.

As shown on the drawings:

With reference to the drawings, especially Figure 1, it will be seen that the illustrated embodiment of the instant invention includes a base support 1 of any desirable or suitable character, upon which is mounted supporting means illustrated in the form of a pedestal 2, and also a block arrangement 3 for supporting a motor 4. With reference also to Figure 5, it will be seen that a drum-like turret or turntable 5 is rotatable with a shaft 6 journaled in the aforesaid pedestal 2. Secured to the underside of the top platform of the turntable 5 is a central reinforcing plate 7, and beneath that reinforcing plate is a stepped insulation disk 8 which carries a pair of spaced collector rings 9 and 10, insulated from each other and from surrounding parts. On the bottom of the insulation disk is a gear 11 by means of which the entire turntable is rotated from the motor 4 by drive means now about to be described.

A gear holding bracket arrangement 12 may be mounted with the casing of the motor 4, and the motor shaft provided with a gear 13, meshing with a gear 14 on a vertical shaft 15 which also carries a gear 16 constantly in mesh with the turntable gear 11. These gears may be proportioned to effect a suitable speed reduction, if so desired. Consequently, whenever the motor 4 is energized, the turntable will be rotated during that period of energization.

The turntable 5 is provided with a number of work holders, preferably evenly spaced therearound. While, in the illustrated instance, there is shown eight such work holders upon the turntable, it is obvious that any desired number may be utilized. In the illustrated instance each work holder is shown as embodying a socket 17 fixedly carried on a hollow shaft 18 suitably collared as indicated at 19. This shaft extends through the turntable 5 in which it may be properly journaled, and is provided on its lower end with a sprocket wheel 20. It will be appreciated that each work holder is shaped to accommodate a particular work piece, and therefore any suitable holder may be substituted for the socket 17, depending upon the character of the particular work piece to be brazed.

Means for rotating each work piece holder are also carried by the turntable 5. In the illustrated instance, these means embody a motor 21 carried on a frame structure 22, and the shaft 23 of this motor is provided with a sprocket drive wheel 24. An endless sprocket chain 25 is trained over the outside of each of the sprocket wheels 20 on the respective work holders, and on the inside of the drive sprocket 24, as best illustrated in Figure 4. Consequently, when the motor 21 is energized, and it preferably will be energized continuously during operation of the brazing machine, all of the work holders will be constantly rotated uniformly by means of the sprocket chain 25.

The motor 21, as indicated in Figure 5, may derive its energy through conductors 26 and 27 from the aforesaid collector rings 9 and 10. These collector rings are in turn energized from a pair of brushes 28 and 29 respectively carried upon a suitable bracket 30 secured to the supporting pedestal 2. Suitable conductors 31 and 32 may connect the brushes 28 and 29 to any suitable source of energy such as a convenience outlet.

With reference more particularly to Figures 1 and 2, it will be seen that the turntable 5 is provided with a stop pin 33 projecting radially from the side of the turntable opposite each of the work holders. These stop pins, in a manner more fully explained later herein, aid in the proper indexing of the turntable so that each work piece is accurately positioned for application of the brazing heat.

The control means governing the rotation of the turntable at periodic intervals, and the supporting means for the heating elements are carried upon a base 34. With reference more particularly to Figures 1, 2 and 3, it will be seen that a tubular upright 35 is mounted on the base 34, this upright being stabilized by braces 36 and 37. Obviously, the upright may be readily adjusted as to height if so desired. This adjustment may be affected by altering the fittings in the upper part of the upright, since the upright is preferably of piping. A horizontal support 38 projects from the upright, and this support carries a sleeve 39 rotatable relatively to the support. Within the sleeve is a holder 40 held in proper adjusted position by a set screw or the equivalent 41, which holder supports a pair of gas lines 42 and 43. The termini of these gas lines are in the form of nozzles 44 and 45, respectively, which nozzles are bendable so that they may be adjusted to apply a flame at the desired brazing point upon the work piece. The gas lines may, of course, be connected to any suitable fuel source, such as an acetylene supply tank.

The base 34, as stated above, also carries the control for the intermittent energization of the motor 4 governing the periodic rotation of the turntable 5. This control unit embodies a motor 46 having its shaft 47 journaled at one end in an upright bearing 48. The motor 46 is of the type that may be selectively adjusted to operate at a very low number of revolutions per minute, and with the instant arrangement, it is proposed to operate the motor 46 at an R. P. M. corresponding to the number of flame nozzles 44 and 45 utilized. For example, if there are two flame nozzles as illustrated, then the motor is preferably operated at 2 R. P. M., and if four flame nozzles are provided to expedite the brazing operations, then the motor may be operated at 4 R. P. M. Obviously, that is not an essential operation schedule, but a satisfactory one given by way of example.

Adjacent the motor 46 is a switch mounting 49 including a pair of contact blades 50 and 51 normally assuming open position by their inherent resiliency, as seen in Figure 3. A cam 52 is carried by the motor shaft 47, and when this cam is in contact with the upper switch blade 50, the circuit is closed, the blades being pressed together by the cam. During that interval of time the turntable motor 4 is energized and the turntable will be rotated by the motor 4 until the motor circuit is opened by virtue of the cam 52 passing off the switch blade 50. It will be understood, of course, that the wiring circuit to the motor 4 includes the switch blades 50 and 51, in a known manner.

It is desirable, of course, to have the turntable stop in a precise position relatively to each of the work holders, and if the movement of the table is dependent entirely upon the energization and deenergization of the motor 4, there will be some coasting upon deenergization of the motor which would throw the table out of proper position at various times. To offset such an occurrance, means are provided to physically stop the table at the desired location upon deenergization of the motor. These means include a crank arm 53 fixed to the motor shaft 47 of the motor 46, and the free end of this crank arm is pivotally connected to a link or pitman 54 which in turn is pivotally associated with a stop pin or rod 55. The rod 55 is vertically reciprocable in a bearing 56 carried by a suitable frame structure 57 mounted upon the base 34. These parts are so arranged that as the cam 52 rides off the upper switch blade 50 (Figure 3) the stop pin 55 is elevated in a position to be contacted by one of the stop pins 33 carried by the turntable 5. During energization of the motor 4, the stop pin will be retracted permitting rotation of the table, and the stop member 55 will be elevated in position to contact the next following pin 33, when the motor is again deenergized. Thus, each work piece will be accurately positioned relatively to the flame nozzles 44 and 45 so that the heat will be applied at the desired locations.

By way of example and not by way of limitation, work pieces 58 have been provided to illustrate an important operation of the instant invention. The work pieces selected for illustrative purposes, with reference to Figure 6, are shown in the form of a dehydrator element for use in a refrigerant line. Such elements include a cylindrical body portion 59, and a flanged cap 60 is provided for a press fit over one end of the body. A similar cap 61 is provided for a press fit over the opposite end of the body 59, and each of these caps is centrally apertured as indicated at 62. In assembling the work piece 58, the cap 60 is pressed into position over the body 59, and between the upper sloping wall portion of the cap and the upper edge of the body a screen 63 is disposed, held in place by a suitable washer 64, and between the washer 64 and the upper end of the body 59 is a flattened ring 65 of silver solder or equivalent substance. Just prior to the mounting of the cap 60 in position, the inner portion of the flanged cap is preferably provided with a suitable flux. The parts will be held in their proper assembled relationship by the press fit, and a pipe fitting 66 having a shank portion extending through the aperture in the end of the cap 60 may be set in position on top of the cap, with a ring 67 of silver solder or the equivalent disposed between the fitting and the cap. This pipe fitting is, of course, also preferably treated with a suitable flux. The assembly just described, for the particular dehydrator in question, is the inlet end, and the screen 63 is not of sufficiently fine mesh to act as a filter for the refrigerant entering the dehydrator, but is sufficiently fine in mesh to maintain a suitable drying compound within the body portion 59. After one end of the dehydrator is assembled in the manner above described, the body portion 59 is filled with a suitable substance having an affinity for water, such as silica gel, and the other end of the dehydrator is then assembled.

It makes no difference which end of the dehydrator is assembled first, but for convenience, we have described the one shown assembled in Figure 6.

The outlet end of the dehydrator is of substantially the same construction as that above described with the exception that two screens and two washers are used, and these screens are of sufficiently fine mesh to function as a filtering medium to remove foreign particles from the refrigerant passing therethrough. In this instance, the cap 61 has therein a screen 68 of relatively fine mesh, a washer 69 for that screen, another screen 70 of a mesh less fine than the screen 68, a washer 71 for that screen, and a ring of silver solder or equivalent 72. Likewise, there is a pipe fitting 66 with a ring of silver solder or equivalent 67 therefor as above described. The parts undergoing brazing are treated with a suitable flux, preferably. When the device is so assembled, it is placed in a socket 17 of one of the work holders. The work piece is brought in its turn into the desired position between the flame nozzles 44 and 45. As indicated more clearly in Figure 1, the flame nozzles are so adjusted as to guide the flame directly upon the portion opposite the silver solder rings. It will be understood that the work holder and consequently the work piece 58 is constantly rotating about its own axis by the operation of the motor 21 and sprocket chain 25 so that the heat will be applied uniformly entirely around the work piece. With the flame nozzles so disposed, both silver solder rings will be brought to a temperature sufficient to melt the silver solder and cause it to flow so as to provide a brazed joint. The uniform heating will insure uniform brazing. However, between the locations of the silver solder rings, for example, the rings 65 and 67, even though they are disposed relatively closely together, there will be in effect a cold area. That is, while the temperature of this area opposite the screen 63 will rise, it will not rise to near the extent of the points where the flame is concentrated, namely, opposite the silver solder rings. Consequently, no damage will be done to the interior screen 63, even though that screen be made of such material as bronze, brass or copper.

Silver solder is mentioned as a suitable brazing medium, because such solder is readily flowable after the melting point is reached, eliminates leaks that would occur with soft solder, and is capable of withstanding pressure.

After one soldering operation is completed, the turntable is automatically rotated in the manner above described and the next work piece brought in position between the nozzles.

At some time during its course of travel around the turntable, a work piece already brazed at one end may be removed from its socket 17, inverted, the solder ring 67 and the fitting 66 applied to the then upright end, and it continues its trip around the table until both ends have been brazed.

By way of example, it may be mentioned that one complete dehydrator may be completely brazed at both ends in the time of one minute. That is, it would require about twenty-seven seconds for the brazing operation, three seconds for the movement out of brazing position, and then a similar course of time for the opposite end of the work piece. Of course, it will be appreciated that the time of operation may be speeded up by incorporating four nozzles instead of the two nozzles illustrated so that the solder may be brought to the melting point in substantially half the time. Any number of flame nozzles may be so provided depending upon what is deemed feasible.

It is to be especially understood that with the instant machine a plurality of brazing operations may be accomplished simultaneously on the same work piece, and the locale of the operations may be very close together without in any manner injuring the contents of the work piece, and without bringing that portion of the work piece between the brazing locations up to brazing temperature.

It will also be noted that the entire succession of brazing operations is substantially continuous, and the machine operates automatically. It is only necessary to set the operation of the motor 46 for the desired revolutions per minute in order to acquire the desired timing, and start the apparatus in motion. The turntable will rotate intermittently at predetermined time intervals, and automatically be brought to rest at the precise location necessary for the next set of brazing operations. While the table rotates intermittently, the work holders are continuously rotated about their own axes. The flames from the nozzles 44 and 45 may, of course, be operating continuously. It is a simple proposition for an attendant to invert the work pieces, if such is necessary, and to refill the turntable or other type of carrier for automatic delivery of the work pieces into brazing position.

It will also be understood that the device is relatively simple in construction, economical to manufacture and operate, and highly durable.

It is believed that the method of brazing embodied in the instant invention is sufficiently clear from the foregoing to warrant no further specific description thereof.

It will of course be understood that various details of the construction and process may be varied through a wide range without departing from the principles of this invention and it is, therefore, not the purpose to limit the patent granted hereon otherwise than necessitated by the scope of the appended claims.

We claim as our invention:

1. In a brazing machine, a turntable, work holders spaced around said turntable, a motor carried by said turntable, drive means between said motor and said holders to cause rotation of said holders around their axes, a stationary motor to rotate said turntable when energized, switch means controlling the energization of said stationary motor, a control motor, cam means actuated by said control motor to close said switch means periodically and for predetermined intervals of time, and a source of brazing heat located to act upon a work piece carried by one of said holders at a certain position in the travel of said turntable.

2. In a brazing machine, a turntable, work holders spaced around said turntable, a motor carried by said turntable, drive means between said motor and said holders to cause rotation of said holders around their axes, a stationary motor to rotate said turntable when energized, switch means controlling the energization of said stationary motor, a control motor, cam means actuated by said control motor to close said switch means periodically and for predetermined intervals of time, a movable stop member also moved through a cycle by said control motor, projecting means carried by said turntable, the arrangement being such that when said cam means open the circuit to said stationary motor said stop member is moved into the path of one of said projecting means to physically stop said turntable and prevent coasting thereof, and a source of brazing heat adjacent the location of said stop member.

MARTIN T. CAHENZLI, Jr.
EDWARD W. MACK.

REFERENCES CITED

The following references are of record in the file of this patent:

UNITED STATES PATENTS

| Number | Name | Date |
|---|---|---|
| 1,662,045 | Patterson | Mar. 6, 1928 |
| 1,671,354 | De Leeuw | May 29, 1928 |
| 1,706,880 | Gustin | Mar. 26, 1929 |
| 1,760,507 | Leebe et al. | May 27, 1930 |
| 1,857,182 | Donovan et al. | May 10, 1932 |
| 1,897,983 | Koca | Feb. 14, 1933 |
| 1,911,046 | Wright | May 23, 1933 |
| 1,997,694 | Morick | Apr. 16, 1935 |
| 2,038,525 | Cate | Apr. 28, 1936 |
| 2,057,037 | Kronquest | Oct. 13, 1936 |
| 2,069,386 | Palucki | Feb. 2, 1937 |
| 2,082,080 | Palucki | June 1, 1937 |
| 2,151,334 | Rockefeller | Mar. 21, 1939 |
| 2,264,496 | Wollentin | Dec. 2, 1941 |
| 2,323,160 | Strecher et al. | June 29, 1943 |
| 2,342,041 | De Bold | Feb. 15, 1944 |
| 2,450,120 | Cate | Sept. 28, 1948 |